(12) United States Patent
Hayashida et al.

(10) Patent No.: US 8,024,115 B2
(45) Date of Patent: Sep. 20, 2011

(54) NAVIGATION APPARATUS, METHOD AND PROGRAM FOR VEHICLE

(75) Inventors: Atsushi Hayashida, Kariya (JP); Eiji Soube, Kariya (JP)

(73) Assignee: DENSO CORPORATION, Kariya (JP)

( * ) Notice: Subject to any disclaimer, the term of this patent is extended or adjusted under 35 U.S.C. 154(b) by 836 days.

(21) Appl. No.: 11/504,045

(22) Filed: Aug. 15, 2006

(65) Prior Publication Data

US 2007/0050134 A1    Mar. 1, 2007

(30) Foreign Application Priority Data

Aug. 24, 2005 (JP) ................................ 2005-242932
Apr. 21, 2006 (JP) ................................ 2006-117982

(51) Int. Cl.
*G01C 21/28* (2006.01)
*G01S 19/49* (2010.01)

(52) U.S. Cl. .................... 701/210; 701/216; 340/995.21

(58) Field of Classification Search .................. 701/36, 701/49, 200, 201, 205, 207–211, 214, 300–302; 340/995.1, 995.16–995.24, 995.27, 995.28; 382/104

See application file for complete search history.

(56) References Cited

U.S. PATENT DOCUMENTS

| | | | | |
|---|---|---|---|---|
| 5,206,811 | A * | 4/1993 | Itoh et al. | 701/211 |
| 5,220,508 | A * | 6/1993 | Ninomiya et al. | 701/207 |
| 6,018,697 | A * | 1/2000 | Morimoto et al. | 701/209 |
| 6,295,503 | B1 * | 9/2001 | Inoue et al. | 701/209 |
| 6,801,638 | B1 * | 10/2004 | Janssen et al. | 382/104 |
| 6,804,604 | B2 | 10/2004 | Yamazaki | |
| 6,944,538 | B2 | 9/2005 | Ishibashi et al. | |
| 7,433,780 | B2 * | 10/2008 | Machino | 701/202 |
| 2001/0021895 | A1 * | 9/2001 | Yamazaki | 701/211 |
| 2003/0187578 | A1 * | 10/2003 | Nishira et al. | 701/301 |
| 2004/0010371 | A1 * | 1/2004 | Matsumoto et al. | 701/300 |
| 2004/0102884 | A1 * | 5/2004 | Tange et al. | 701/48 |
| 2004/0236498 | A1 * | 11/2004 | Le et al. | 701/200 |
| 2005/0055158 | A1 * | 3/2005 | Machino | 701/209 |
| 2005/0071080 | A1 * | 3/2005 | Sano | 701/209 |

(Continued)

FOREIGN PATENT DOCUMENTS

| | | |
|---|---|---|
| JP | A-2000-88595 | 3/2000 |
| JP | A-2002-318130 | 10/2002 |
| JP | A-2003-178397 | 6/2003 |

OTHER PUBLICATIONS

Canadian Examination Report in the corresponding CA application No. 2,556,602 dated May 25, 2007.

*Primary Examiner* — Mark Hellner
*Assistant Examiner* — Ari M Diacou
(74) *Attorney, Agent, or Firm* — Posz Law Group, PLC

(57) ABSTRACT

An onboard navigation apparatus provides travel guidance on a road including a plurality of roadways heading in the same direction. The road specifically includes a special roadway such as a carpool lane having no exits to other roads, an ordinary roadway having exits to the other roads and a predetermined traveling-path changing area provided as a sole area allowing a vehicle to change a traveling path thereof between the special roadway and the ordinary roadway. The apparatus determines a present position of a vehicle, determines whether the detected position is in the special roadway or in an ordinary roadway. The apparatus provides, in addition to normal travel guidance, information on the traveling-path changing area existing ahead of the vehicle on a display, when the detected position is in the special roadway.

9 Claims, 6 Drawing Sheets

U.S. PATENT DOCUMENTS

| | | |
|---|---|---|
| 2005/0086051 A1* | 4/2005 | Brulle-Drews .................. 704/7 |
| 2005/0143911 A1* | 6/2005 | Ishibashi et al. ............. 701/209 |
| 2005/0155808 A1* | 7/2005 | Braeuchle et al. ............ 180/402 |
| 2005/0209748 A1* | 9/2005 | Watanabe et al. ............... 701/23 |
| 2008/0114532 A1* | 5/2008 | Nishida et al. ................ 701/200 |
| 2008/0249710 A1* | 10/2008 | Takada ......................... 701/209 |

* cited by examiner

FIG. 2A
NODE TABLE

| #0 NODE RECORD |
|---|
| #1 NODE RECORD |
| #2 NODE RECORD |
| ⋮ |

FIG. 2B
CONNECTION NODE TABLE

| | |
|---|---|
| (a) | NORMALIZED LONGITUDE |
| | NORMALIZED LATITUDE |
| (b) | NODE ATTRIBUTE FLAG |
| (c) | NUMBER OF NODES |
| (d) | NUMBER OF REGULATIONS |
| | ⋮ |
| (e) | #0 CNR (LINK NUMBER) |
| | #1 CNR (LINK NUMBER) |
| | ⋮ |
| (f) | #0 REGULATION RECORD |
| | #1 REGULATION RECORD |
| | ⋮ |
| (g) | ADJACENT NODE RECORD |
| (h) | STORAGE LOCATION |
| | SIZE |

FIG. 2C
LINK TABLE

| #0 LINK RECORD |
|---|
| #1 LINK RECORD |
| #2 LINK RECORD |
| ⋮ |

LINK RECORD

| | |
|---|---|
| (a) | LINK ID |
| (b) | NODE NUMBER 1 |
| | NODE NUMBER 2 |
| (c) | LINK LENGTH (DISTANCE) |
| (d) | COST |
| (e) | ROAD ATTRIBUTE FLAG (ORDINARY, ETC.) |
| (f) | ROAD-TYPE FLAG (CARPOOL LANE, ETC.) |
| (g) | ROAD NUMBER |
| | ⋮ |

# NAVIGATION APPARATUS, METHOD AND PROGRAM FOR VEHICLE

CROSS REFERENCE TO RELATED APPLICATION

This application relates to and incorporates herein by reference Japanese Patent Applications No. 2005-242932 filed on Aug. 24, 2005 and No. 2006-117982 filed on Apr. 21, 2006.

FIELD OF THE INVENTION

The present invention relates to a navigation apparatus, a navigation method and a navigation program for a vehicle, which carry out predetermined navigation processing by using road data.

BACKGROUND OF THE INVENTION

A conventional navigation apparatus detects the present position of a vehicle by using a GPS or the like while the vehicle is traveling, displays the present position over a road map on a display unit, and sets a proper route from the present position to a destination as guidance toward the destination. Such a navigation apparatus contributes to easier driving. It is to be noted that, as driving guidance, the proper route from the present position to the destination is shown in a color different from other roads on the map on the display unit or shown by a thick line on the display unit. Besides such a proper route, the driving guidance also enlarges the display of an intersection, which the vehicle enters next, and outputs guiding sounds in order to lead the driver to the destination.

In addition, in a process to set the proper route from the present position to the destination, in general, Dijkstra's method or a technique conforming to the method is adopted. More specifically, the cost (or the evaluation value) of each route from the present position to the destination is computed by using information on links between nodes. When the calculation of the cost of every link from the present position to the destination is completed, links providing a minimum total cost are connected to each other to set a route from the present position to the destination. In a process to set a route from the present position to the destination, however, a road on which the vehicle is not allowed to travel is not included in the route. Examples of such roads are a one-way road or a road specially provided for pedestrians. If information on link interconnection reveals such vehicle-travel restrictions, the route from the present position to the destination can be set by exclusion of roads each subjected to the restrictions.

The vehicle-traveling restrictions established for roads such as a one-way road and a road specially provided for pedestrians do not necessarily apply to all vehicles uniformly. As an example, one of road systems seen in freeways in big cities mainly in the U.S. includes a HOV lane (carpool lane). A carpool lane is provided to recommend car sharing for the purpose of reducing the number of vehicles traveling on roads. Specifically, only a high occupancy vehicle (HOV) having a plurality of passengers therein is allowed to travel along a carpool lane. When the driver of a vehicle is the only passenger in the vehicle, the vehicle is subjected to the vehicle-traveling restriction established for the carpool lane. In the U.S., there are relatively many vehicles not having passengers other than the driver. Thus, in comparison with ordinary roadways, the traffic of a carpool lane is light. As a result, a vehicle with one or more passengers besides the driver is allowed to travel along a carpool lane and hence capable of substantially shortening the travel time.

In some cases, a carpool lane is provided separately from an ordinary roadway, which does not require that a traveling vehicle have at least one passenger besides the driver of the vehicle. However, such a carpool lane may coexist with an ordinary roadway on the same road as two lanes having the same traveling direction. That is, the road is divided into lanes by one or more lines, or the lanes are merely partitioned from each other by a partitioning line (or a lane mark). In some cases, the carpool lane and the ordinary roadway are partitioned from each other by a guard rail. In this case, a vehicle is allowed to change its traveling path from the carpool lane to the ordinary roadway or vice versa only in a predetermined traveling-path changing area. That is, a vehicle is allowed to leave the carpool lane and enter the ordinary roadway or vice versa only in the predetermined traveling-path changing area.

On the other hand, an exit from a freeway including a carpool lane and an ordinary roadway to another road is provided and available only to the ordinary roadway of the freeway. By viewing a display appearing on a navigation apparatus as the display of a map showing the vicinity of a vehicle or by using a route navigation function, the driver of a vehicle traveling along a carpool lane may be aware of the fact that the vehicle is approaching such an exit of the freeway. Nevertheless, the vehicle is not capable of entering the ordinary roadway from the carpool lane. This is because there is no point to depart from the carpool lane and enter the ordinary roadway or there is no point of changing a traveling path from the carpool lane to the ordinary roadway. As a result, in some cases, the vehicle inevitably travels past the exit of the freeway. In particular, in the case of a freeway provided in a big city as a freeway having a number of ordinary roadways, this problem arises more often.

In order to solve the above problem, a vehicle traveling along a carpool lane should return to an ordinary roadway in well advance of taking an exit. When there are several points to depart from the carpool lane and enter the ordinary lane prior to such an exit of the freeway and the vehicle return to the ordinary roadway through an early departure point, the distance of traveling along the carpool lane unavoidably becomes short, raising another problem of not being capable of traveling with a high degree of efficiency. This problem is raised not only in a vehicle traveling along a carpool lane, but the problem is also raised in a vehicle traveling on an ordinary roadway subjected to a restriction on the traveling direction.

A solution addressing such a problem is disclosed in U.S. Pat. No. 6,804,604 (JP 2001-183159A). In accordance with this solution, by including road information provided as map data and carrying out navigation processing by using the map data, a vehicle is capable of traveling along a carpool lane with a high degree of efficiency. This is because a navigation operation is carried out by considering restrictions on changing a traveling path from the carpool lane to an ordinary roadway and vice versa or restrictions on departing from the carpool lane to enter an ordinary roadway and vice versa.

Even when navigation processing is carried out by using navigation data created by taking carpool lanes into consideration, the solution still has the following problems.

(1) The solution assumes that the present position is on a carpool lane without determining whether the present position is on a carpool lane or an ordinary roadway. Thus, when a traveling-path changing area, which allows a vehicle to change its traveling path from a carpool lane to an ordinary roadway, exists ahead of the vehicle, the driver of the vehicle is merely informed of the existence of the traveling-path changing area. Accordingly, when the vehicle driver notified of the existence of the traveling-path changing area is capable of correctly determining whether the present position is on a carpool lane or an ordinary roadway, the notice of the existence of the traveling-path changing area may be useful to the driver in its own right. It is very likely, however, that the driver of the vehicle is not capable of correctly determining whether the present position is on a carpool lane or an ordinary roadway. For a driver not capable of correctly determining whether the present position is on a carpool lane or an ordinary roadway, a navigation apparatus also capable of providing user-friendly guidance is preferable.

(2) For example, a vehicle has departed from a carpool lane of a freeway to enter an ordinary roadway of the same freeway in an attempt to leave the freeway through an exit of the freeway to travel on another road. In this case, it is possible to consider that there is no necessity to inform the driver of the existence of the traveling-path changing area allowing the vehicle to change its traveling path from a carpool lane to an ordinary roadway thereafter or, when there is such necessity, the degree of the necessity is considered to be extremely low. In accordance with the above solution, however, when a traveling-path changing area allowing a vehicle to change its traveling path from a carpool lane to an ordinary roadway exists ahead of the vehicle, the driver of the vehicle is notified of the existence of the traveling-path changing area. Thus, for the driver of a vehicle, the notice of the existence of the traveling-path changing area is not required or, when required, the notice will be guidance of a low level of necessity.

(3) It is difficult for a position detection unit using the GPS to determine a lane, on which the present position of a vehicle is located, with a high degree of precision. A communication between an onboard device mounted on the vehicle and on-road devices provided on a road can be carried out to determine the type of a lane, on which the present position of a vehicle is located. However, this solution to the problem is based on the assumption of complete infrastructure equipment including the on-road devices provided on a road. Thus, from the practical point of view, this solution to the problem is difficult to implement.

Real implementation of a carpool lane has been taken into consideration so far. However, the same problem is also raised in a road structure wherein 'a plurality of roads having the same traveling direction has a configuration including a special roadway having no exits to other roads and an ordinary roadway having exits to other roads, and a vehicle is allowed to change its traveling path from the special roadway to the ordinary roadway or vice versa only in a predetermined traveling-path changing area.' Examples of the special and ordinary roadways are respectively an express lane and a local lane, which exist in the East-Coast areas of the U.S.

SUMMARY OF THE INVENTION

It is an object or the present invention to provide a navigation apparatus, a navigation method and a navigation program capable of providing guidance to a vehicle traveling in a road structure including a special roadway having no exits to other roads, an ordinary roadway having exits to other roads and a predetermined traveling-path changing area between the two roadways.

According to one aspect of the present invention, an onboard navigation apparatus provides travel guidance on a road including a plurality of roadways heading in the same direction. The road specifically includes a special roadway such as a carpool lane having no exits to other roads, an ordinary roadway having exits to the other roads and a predetermined traveling-path changing area provided as a sole area allowing a vehicle to change a traveling path thereof between the special roadway and the ordinary roadway. The apparatus determines a present position of a vehicle, determines whether the detected position is in the special roadway or in an ordinary roadway. The apparatus provides, in addition to normal travel guidance, information on the traveling-path changing area existing ahead of the vehicle on a display, when the detected position is in the special roadway.

BRIEF DESCRIPTION OF THE DRAWINGS

The above and other objects, features and advantages of the present invention will become more apparent from the following description made with reference to the accompanying drawings. In the drawings:

FIGS. 2A, 2B and 2C are tables showing detailed contents of respectively a connection node table, a node table and a link table, which are included in a road unit;

DETAILED DESCRIPTION OF THE PREFERRED EMBODIMENT

Navigation Apparatus

Figure 1:
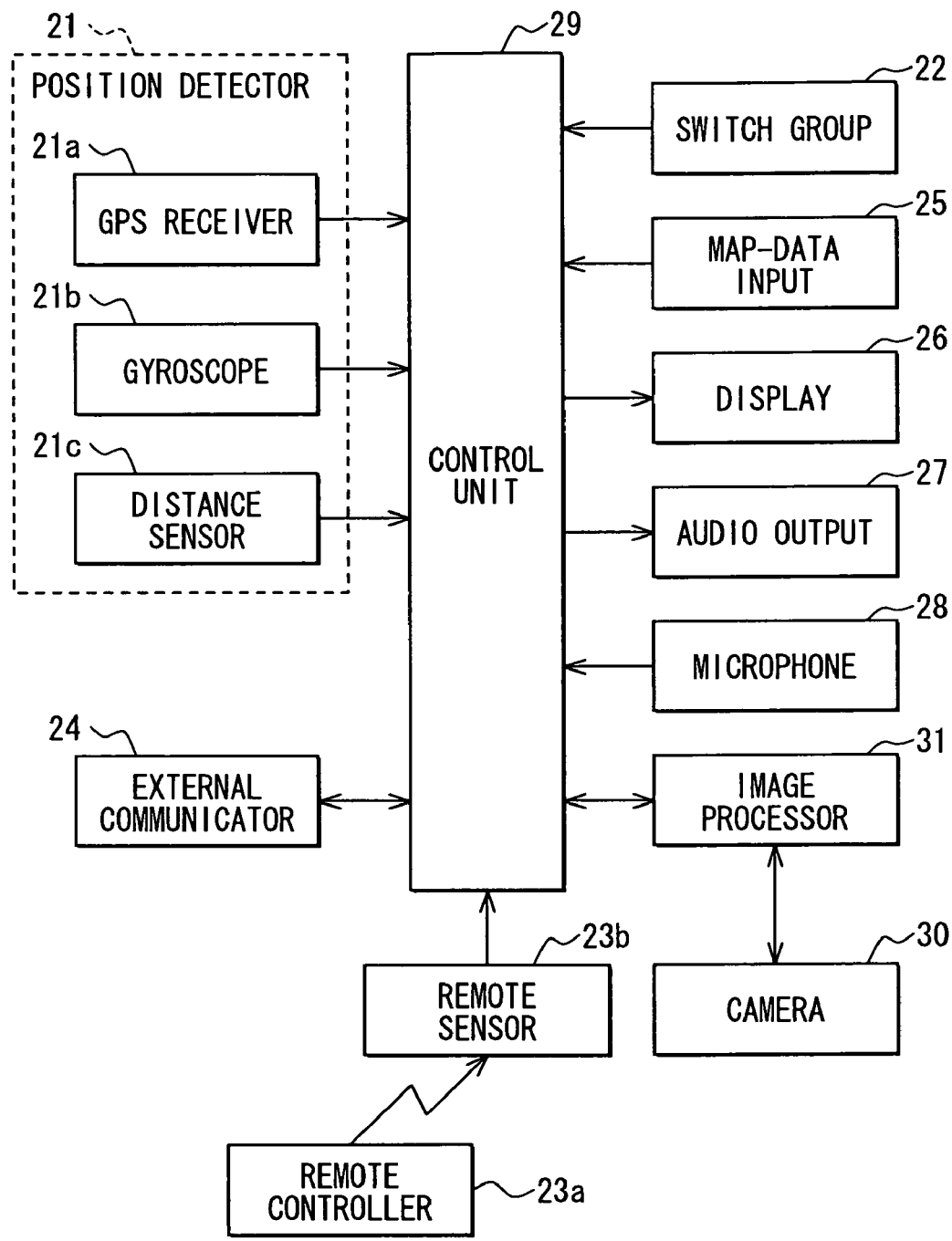
FIG. 1 is a block diagram showing a navigation apparatus according to an embodiment.

Referring first to FIG. 1, a navigation apparatus 1 is mounted on a vehicle, and constructed with a position detector 21, an operation switch group 22, a remote controller 23a, a remote sensor 23b, an external communicator 24, a map-data input unit 25, a display unit 26, an audio output unit 27, a microphone 28, a control unit 29, a camera 30, and an image processor unit 31.

The position detector 21 is for detecting the present position of the vehicle. The operation switch group 22 is a group of switches to be operated by a user to enter a variety of commands. The remote controller 23a is a unit to be operated by the user to enter a variety of commands much like the operation switch group 22 except that the remote controller 23a is provided as a unit separated from the navigation apparatus 1. The remote sensor 23b is for receiving signals generated by the remote controller 23a. Connected to typically a packet communication network, the external communicator 24 is a unit for carrying out communications with an external apparatus through the packet communication network. The map-data input unit 25 is for inputting information such as map data and audio data from a map storage medium used for recording the information. The display unit 26 is for displaying a map and various kinds of information. The audio output unit 27 is for outputting a variety of guiding sounds or the like. The microphone 28 is for generating an electrical signal based on a voice spoken by the user. The camera 30 is for taking a picture of the surface of a road lying ahead of the vehicle. The image processor unit 31 is for detecting a road mark, which indicates a carpool lane, from a picture taken by the camera 30. The control unit 29 is for carrying out various kinds of processing in accordance with inputs received from the position detector 21, the operation switch group 22, the remote sensor 23b, the external communicator 24, the map-data input unit 25 and the microphone 28, as well as controlling the external communicator 24, the display unit 26, the audio output unit 27 and the image processor unit 31.

The position detector 21 includes a GPS receiver 21a, a gyroscope 21b, and a distance sensor 21c. The GPS receiver 21a is for receiving radio waves transmitted by artificial satellites of a GPS (Global Positioning System) and supplying electric signals corresponding to the received radio waves to the control unit 29. The gyroscope 21b is for detecting the magnitude of a rotational motion applied to the vehicle. The distance sensor 21c is for detecting a traveling distance of the vehicle from information such as accelerations in the forward and backward directions of the vehicle. The control unit 29 computes various values such as the position, azimuth and speed of the vehicle on the basis of signals received from the GPS receiver 21a, the gyroscope 21b and the distance sensor 21c. It is to be noted that there are a variety of methods for finding the present position of the vehicle on the basis of a road signal received from the GPS receiver 21a. In this case, the method adopted by the embodiment as a method for finding the present position of the vehicle can be an independent measurement method or a relative measurement method.

The operation switch group 22 includes a touch panel integrated with the display screen of the display unit 26 and mechanical key switches provided in the vicinity of the display unit 26. It is to be noted that the touch panel is integrated with the display unit 26 in the form of a stacked layer. The touch panel may adopt any method of sensing a touch. The adopted method is one selected among a variety of touch sensing methods including a pressure-sensing method, an electro-magnetic induction method, and a static capacitance method. As an alternative, the adopted method is a combination of any of the touch sensing methods.

The external communicator 24 is for acquiring various kinds of information such as information on accidents and information on traffic congestions from a VICS information center through an optical beacon and/or an electric-wave beacon, which are installed on shoulders of a road.

The map-data input unit 25 is for acquiring various kinds of data from a map-data storage medium (not shown). Examples of the map-data storage medium are a hard disk and a DVD-ROM.

The display unit 26 is a color display unit, which is typically a liquid-crystal display unit, an organic EL display unit or a CRT. The display unit 26 is capable of displaying pieces of information on the display screen by superposing the pieces of information on each other. The displayed information includes a road mark showing the present position, a guiding route leading to a destination, and additional data. The present position is displayed on the basis of a position detected by the position detector 21 as the present position of the vehicle and map data acquired by the map-data input unit 25. The additional data includes location names, signs of places of interest and a variety of facility marks. In addition, the display unit 26 is also capable of displaying guides to institutions of interest.

The audio output unit 27 is for outputting a guide received from the map-data input unit 25 as a guide to an institution and sounds representing various kinds of guidance.

The microphone 28 is for receiving a voice of the user and supplying an electrical signal (or an audio signal) representing the voice to the control unit 29. By inputting a variety of voice commands into the microphone 28, the user is capable of operating the navigation apparatus 1.

The camera 30 is for taking a picture of scenery including a road lying ahead of the vehicle. Typically, the camera 30 is a CCD camera. The camera 30 is typically installed on the ceiling of the interior of the vehicle, being placed at a position in close proximity to the seat of the driver or attached to the rear-view mirror. Of course, the camera 30 can be located at any position as long as the camera 30 is capable of taking a picture of scenery including a road lying ahead of the vehicle. To be more specific, the camera 30 is used for taking a picture of a road mark provided on a carpool lane. The road mark will be described later.

The image processor unit 31 is for detecting a road mark of a carpool lane from a picture, which has been taken by the camera 30, by inputting an analog picture signal output by the camera 30, converting the analog picture signal into digital picture data, and carrying out processes such as filtering on the digital picture data, and for supplying a result of detection to the control unit 29. In the process of detecting a road mark of a carpool lane, the image processor unit 31 compares each mark included in the taken picture with a specific figure stored in advance in a template database to determine whether or not the road mark matches the figure.

The road mark on a carpool lane may be provided as follows.

At an entrance to a freeway including a carpool lane and a road shoulder of a carpool lane, a road sign indicating the carpool lane is installed. In many cases, used as such a road sign, a phrase indicating: "CARPOOL LANE" can be written on the surface of the road serving as a carpool lane or the surface of the road is painted with a road mark having the shape of a diamond. Thus, the template database employed in the image processor unit 31 is used for storing the phrase indicating: "CARPOOL LANE" and/or the road mark having the shape of a diamond as a template figure for detection of a carpool lane.

It is to be noted that, of course, with regard to the template figure corresponding to the phrase of "CARPOOL LANE," a figure having the same shape as the phrase written on the surface of the road is stored in the template database in advance. That is, such a road mark is written on the surface of a carpool lane at such a location that the driver of a vehicle traveling on the carpool lane is capable of watching the road mark with ease, and the shape of the figure is merely made identical with the road mark.

Specifically, for example, the phrase "CARPOOL LANE" may be written on the surface of the carpool lane, by being split into 3 words, i.e., CAR, POOL, and LANE with the word CAR placed at a location closest to the traveling vehicle to be followed by the word POOL followed by the word LANE. In this case, a template figure is stored in the template database as a figure having a shape identical with the road mark.

The control unit 29 has a configuration based on a commonly known microcomputer comprising a CPU, a ROM, a RAM, a SRAM and an I/O unit, which are connected to each other by a bus line or the like. The CPU is a unit for executing programs, which have been stored in the ROM and the RAM, in order to carry out various kinds of processing.

The processing carried out by the control unit 29 typically includes a present-position displaying process, a route computation process, and a route guiding process. In the present-position displaying process, the control unit 29 computes the present position of the vehicle on the basis of a variety of detection signals received from the position detector 21. For example, the control unit 29 finds the present position as a pair consisting of the coordinates and traveling direction of the vehicle. Then, the control unit 29 retrieves the map of the vicinity of the present position from the map-data input unit 25 and displays the map on the display unit 26, superposing the present position on the map. In the route computation process, the control unit 29 computes an optimum route from the present position to a destination on the basis of map data stored in the map-data input unit 25 and the destination, which is set by operating the operation switch group 22, the remote controller 23a and other input devices. In the route guiding process, the control unit 29 shows the computed optimum route to the user by displaying the route on the display unit 26 and outputting sounds through the audio output unit 27.

In particular, in the route guiding process, on the basis of available information, the control unit 29 identifies points required in guidance to be given to the user and determines what kind of guidance (or the navigation) is needed. The available information includes the optimum route obtained as a result of the route computation process and various kinds of information included in the map data as information on shapes of roads, information on the locations of intersections, information on the locations of railway crossings and other information. In a typical kind of the guidance, a command to turn right or left is given to the user.

In addition, on the basis of a detection result generated by the image processor unit 31, the control unit 29 produces a result of determination whether or not the vehicle is traveling on a carpool lane at the present time. When the result of the determination indicates that the vehicle is traveling on a carpool lane at the present time, in the present-position displaying process to display the present position superposed on a map on the display unit 26 and the route guiding process, the control unit 29 also carries out processing peculiar to a case in which the vehicle is traveling on a carpool lane.

(Map Data)

As described above, the map-data input unit 25 is for inputting various kinds of data from a map-data storage medium (not shown). The data stored in the map-data storage medium includes map data, guidance audio data and audio recognition data. The map data includes node numbers, link numbers, data representing the shape of each road, data representing the width of each road, data representing the type of each road, road numbers, data representing regulations imposed on each road, data representing shapes of ground surfaces, road marks, information on intersections and data of facilities.

The map data includes units, which are each a rectangular geographical segment delimited by predetermined latitudes and predetermined longitudes. Map data of every geographical segment is identified by specifying a segment number assigned to the geographical segment. Map data identified in this way as the data of a geographical segment can be read out from the map data. The map data of each geographical segment includes a drawing unit, a road unit, and an intersection unit. The drawing unit is composed of various kinds of data required in a process to display a map. The road unit is composed of data required in various kinds of processing such as a map-matching process, a route searching process and a route derivation process. The intersection unit is composed of detailed data representing intersections and other road elements. In addition, the drawing unit also includes data of background layers required to express map elements such as buildings and rivers as well as data of character layers required to express names such as the name of a town, a city or a village and the name of a road.

In a road map described above, a line connecting an intersection on a road to an adjacent intersection is referred to as a link. An intersection connected to at least 2 links is referred to as a node. The road unit includes a unit header, connection node tables, a node table and a link table. The unit header is information used for indicating that the unit is a road unit. A connection node table is table showing detailed data of a node. The node table is a table defining the storage location of each connection node table. The link table is a table defining detailed data of each link connecting two adjacent nodes.

FIGS. 2A, 2B and 2C are tables showing detailed contents of respectively the node table, the connection node table and the link table, which are included in the road unit. As shown in FIG. 2A, the node table is used for storing node records #0, #1 and so on of all nodes included in the geographical segment having a road unit including the node table. Node numbers #0, #1 and so on are assigned to node records respectively in an order in which the node records are listed. A node record of a node is the storage location of a connection node table showing the detailed data of the node.

As shown in FIG. 2B, a connection node table shows the following pieces of data (a) to (h) for each existing node.

(a) A normalized latitude and a normalized longitude (b) A node attribute flag including:

an intersection-node flag indicating whether or not the corresponding node is an intersection node;

an adjacency node flag indicating whether or not the corresponding node is located on a boundary with another geographical segment; and a traveling-path changing flag indicating whether or not the corresponding node corresponds to a traveling-path changing area described earlier.

(c) A node count representing the number of nodes serving as ends of links each having the other end connected to the corresponding node.

(d) A regulation count representing the number of traffic regulations applied to a link connected to the corresponding node as, for example, traffic regulations prohibiting a right turn and a U turn.

(e) As many connection node records (CNR) as links each having an end connected to the corresponding node. Each of the connection node records corresponds to a link, representing a link number assigned to the link.

(f) As many traffic regulation records as above traffic regulations (d). Each of the traffic regulation record corresponds to a traffic regulation, describing the regulation concretely.

(g) An adjacent node record showing the location of a connection node table of a node in an adjacent geographical segment when the corresponding node is located on a boundary with the adjacent geographical segment.

(h) The storage location and size of an intersection record in an intersection unit when the corresponding node is an intersection node.

As shown in FIG. 2C, the link table shows a plurality of link records arranged in an order of increasing link numbers each assigned to one of all links included in the geographical segment having a road unit including the link table. Each of the link records corresponds to a link, including the following pieces of data (a) to (g).

(a) A link ID expressed by a code assigned to the corresponding link as a code used mainly in a route search display.

(b) Node number 1 and node number 2, which are used for identifying respectively 2 nodes at the ends of the corresponding link.

(c) A link length (d) A cost incurred when traveling through the corresponding link.

(e) A variety of road attribute flags including attributes of a road pertaining to the corresponding link. An example of an attribute of a road is information indicating whether or not a one-way regulation is imposed on the road.

(f) A road-type flag indicating the type and width (expressed in terms of meters) of an actual road serving as the corresponding link. For example, the type of a road may indicate that the road is a freeway, an ordinary roadway, a road including a carpool lane, or a road corresponding to a predetermined traveling-path changing area allowing a vehicle to change its traveling path from a carpool lane to an ordinary roadway and vice versa as will be described below.

(g) A road number assigned to a road serving as the corresponding link.

Figure 3A:
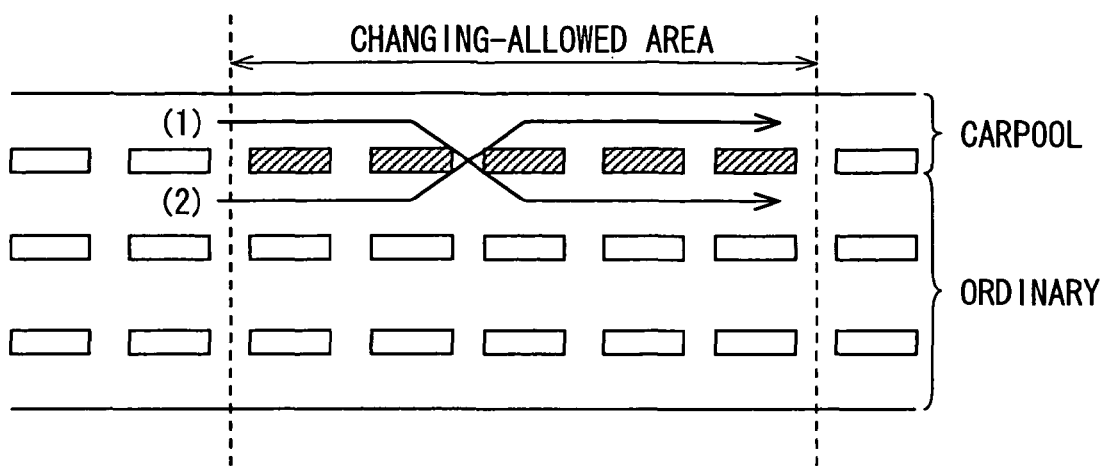
FIGS. 3A and 3B are schematic diagrams showing respectively a traveling-path changing area and a method of setting information on each node and each link, which are associated with the traveling-path changing area.

For a pair consisting of a carpool lane and an ordinary roadway, a traveling-path changing area is determined in advance as an area in which a vehicle is allowed to change its traveling path from the carpool lane to the ordinary roadway and vice versa as described below. In such a traveling-path changing area, a boundary line drawn between the carpool lane and the ordinary roadway to serve as a partition line separating the carpool lane and the ordinary roadway from each other is shown in a color different from those of other boundary lines. As shown in FIG. 3A, in a traveling-path changing area, the following conditions are set:

(1) A vehicle traveling on the carpool lane is allowed to change its traveling path from the carpool lane to the ordinary roadway.

(2) A vehicle satisfying predetermined conditions is allowed to change its traveling path from the ordinary roadway to the carpool lane. An example of the conditions requires that the vehicle has at least one passenger besides the driver.

In road and lane portions other than the traveling-path changing area, on the other hand, a vehicle is not allowed by all means to change its traveling path from the carpool lane to the ordinary roadway and vice versa. That is, as shown in FIG. 5A, the carpool lane and the ordinary roadway are configured to include traveling-path changing areas and portions other than the traveling-path changing areas.

Figure 4:
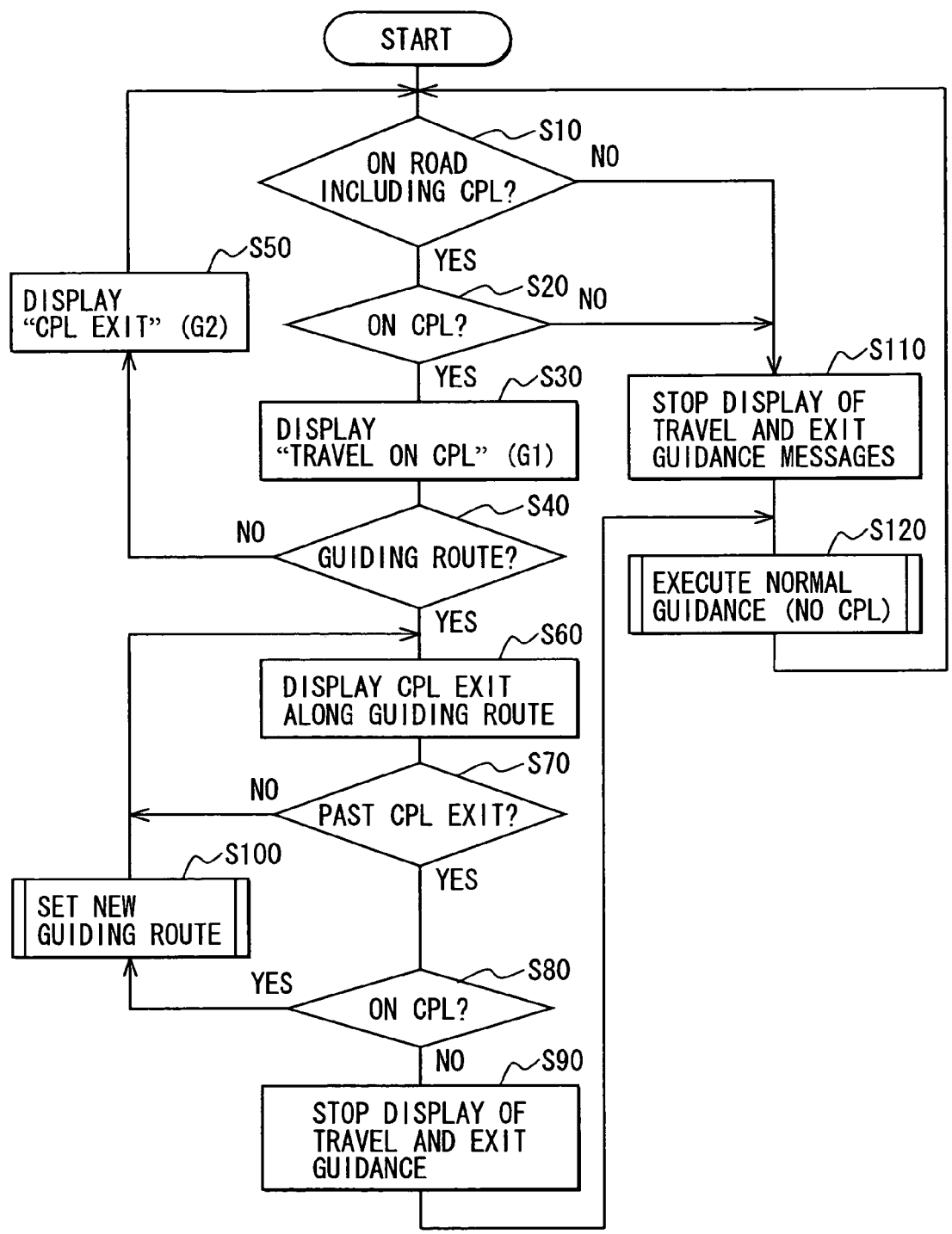
FIG. 4 shows a flowchart representing guidance control processing executed in the embodiment.
Figure 5A:
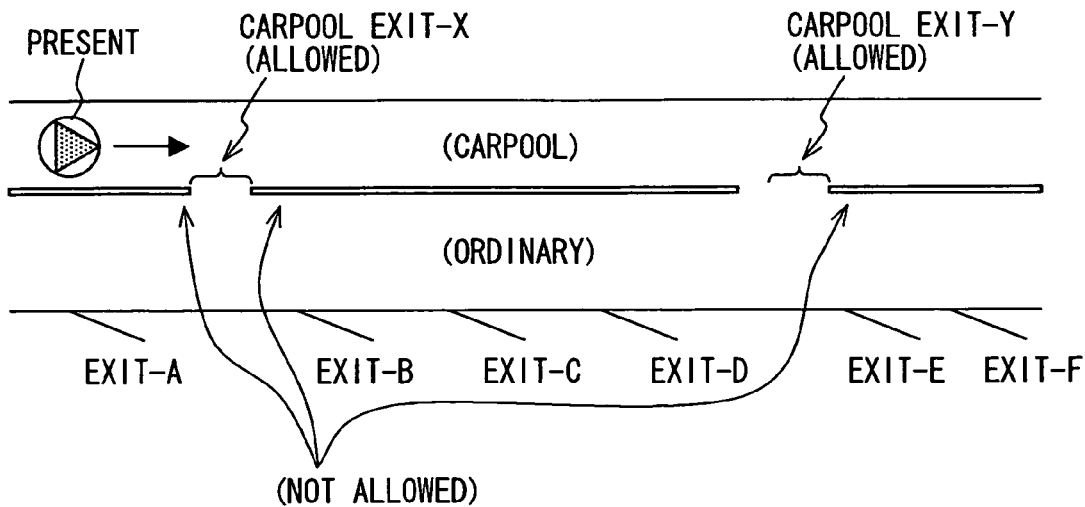
FIGS. 5A, 5B and 5C are schematic diagrams showing carpool exits, ordinary-roadway exits and exit guidance displays for a carpool lane.
Figure 5B:
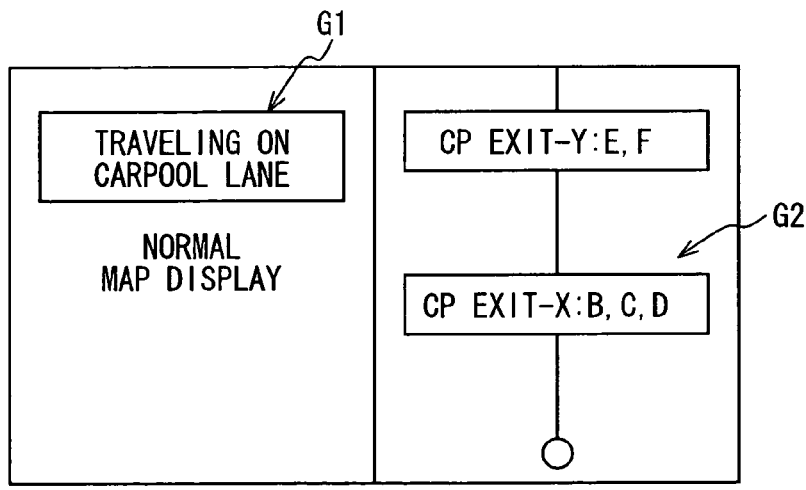
Figure 5C:
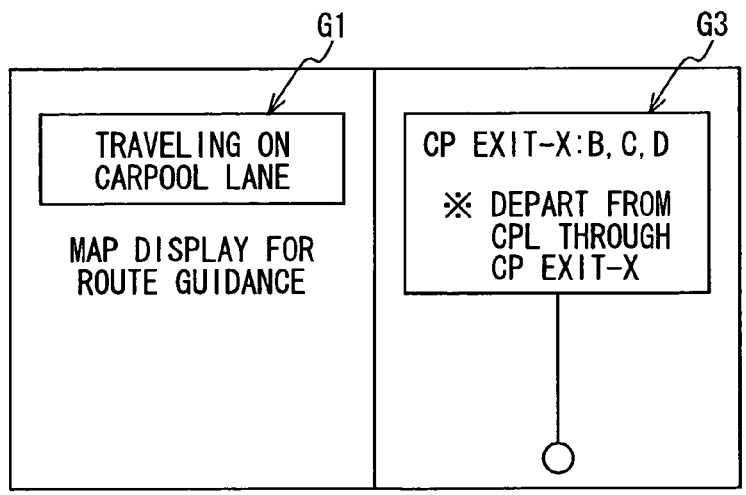

The operation of the navigation apparatus 1 is described by referring to a flowchart shown in FIG. 4 as well as FIGS. 5A, 5B, and 5C. It is to be noted, however, that in the course of the operation described below, several cases are each assumed as a case in which the vehicle moves from the carpool lane to the ordinary roadway in a traveling-path changing area. For this reason, in the following description of the operation, a traveling-path changing area for such a case is referred to simply as a carpool exit.

Figure 3B:
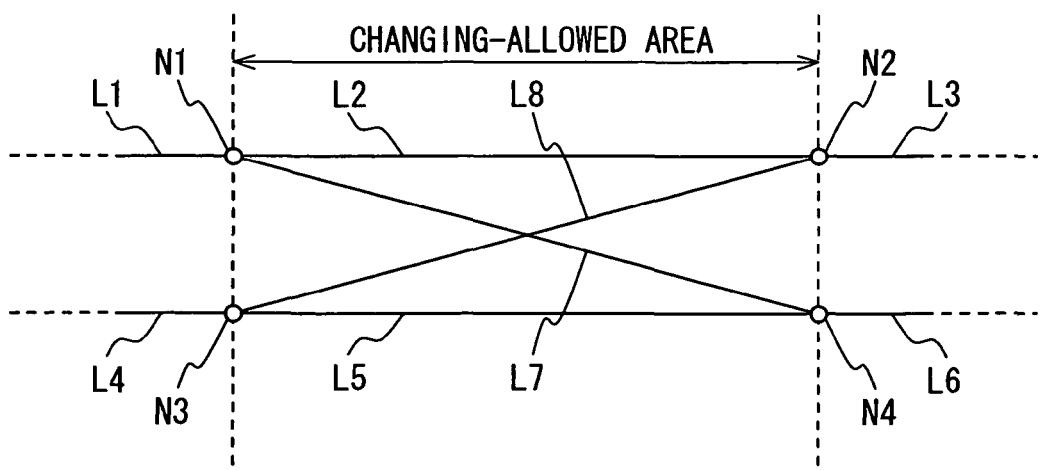

A traveling-path changing area as well as information on each link and each node, which are associated with the traveling-path changing area, are described by referring to FIGS. 3A and 3B. FIG. 3A shows a model of a traveling-path changing area. Vehicles in this model shown in the figure are assumed to be traveling in a direction from the left to the right. The innermost lane (or the uppermost lane in the figure) among 4 lanes in the model is a carpool lane. On the other hand, the remaining 3 lanes are each an ordinary roadway.

Thus, route guidance is guidance concerning the traveling-path changing area. This is because, for example, when a vehicle traveling on the carpool lane has approached an area within a predetermined distance from the vehicle to a freeway exit on a guided route, the vehicle departs from the carpool lane and moves toward the freeway exit (which is normally connected to the outermost lane). Even in the case of non-route guidance, a flag is set in advance as information indicating that guidance related to a traveling-path changing area is to be provided. When such information has been set, guidance related to a traveling-path changing area is provided.

FIG. 3B is an explanatory diagram referred to in description of information on each link and each node, which are located in the vicinity of a traveling-path changing area. Each circle mark denotes a node and a straight line connecting two nodes to each other denotes a link. In FIG. 3B, links L1 to L3 pertain to a carpool lane whereas links L4 to L6 pertain to an ordinary roadway. Nodes N1, N2, N3 and N4 are each a node set for the traveling-path changing area. A link L7 is a route through which a vehicle changes its traveling path from a route (1) shown in FIG. 3A as the carpool lane to the ordinary roadway. On the other hand, a link L8 is a route through which a vehicle changes its traveling path from a route (2) shown in FIG. 3A as the ordinary roadway to the carpool lane.

In the embodiment, a traveling-path changing area is basically treated in the same way as an intersection in a normal route searching process by setting information on each node and each link, which are associated with the traveling-path changing area. Specifically, as understood from an example shown in FIG. 3B, for a freeway, information on nodes and links is stored in a memory by dividing the information into a portion for a carpool lane and another portion for an ordinary roadway. As for the traveling-path changing area, link information for routes used for changing the traveling path from the carpool lane to the ordinary roadway and vice versa is also stored in a memory. In the case of this example, the routes used for changing the traveling path are the links L7 and L8 described above. Thus, guidance for changing a traveling path from a lane to another by selecting a proper traveling-path changing area can be provided to the driver of a vehicle traveling along a guiding route set to include a traveling-path changing area when the vehicle has approached an exit of a freeway.

Traveling costs for the links L1 to L8 are set by considering average speeds of traveling along the carpool lane and the ordinary roadway. The costs of traveling along the links L1 to L3 pertaining to the carpool lane are set at values lower than the costs of traveling along the links L4 to L6 pertaining to the ordinary roadway. The costs of traveling along the links L7 and L8 serving as routes used for changing the traveling path are typically set at average values of the costs of traveling along the links L1 to L3 and the costs of traveling along the links L4 to L6.

(Guidance Control)

Next, guidance control processing carried out by the control unit 29 is described by referring to the flowchart shown in FIG. 4 as well as FIGS. 5A, 5B and 5C.

It is to be noted that the flowchart shown in FIG. 4 represents details of the guidance control processing, which is customized to a carpool lane to characterize the navigation apparatus 1 according to the embodiment. However, a process carried out at step (S) 100 to set a guiding route anew and a process carried out at S120 to provide normal guidance not customized to a carpool lane are each described only briefly.

First at S10, the control unit 29 starts execution of the guidance control processing by determining whether or not the vehicle is traveling on a road including a carpool lane (CPL). The determination process is based on data included in the map data read out from a map-data storage medium through the map-data input unit 25. That is, the control unit 29 determines which link on the map data includes a position computed on the basis of detection signals received from the position detector 21 as the present position of the vehicle. Then, the control unit 29 refers to the link table shown in FIG. 2C to determine whether or not the vehicle is traveling on a road including a carpool lane on the basis of the road-type flag of a link determined to be the link on which the vehicle is traveling.

When the determination result at S10 is YES meaning that the vehicle is traveling on a road including a carpool lane, the guidance control processing proceeds to S20 to determine whether or not the vehicle is traveling on the carpool lane. Specifically, as described above, on the basis of an analog picture signal output by the camera 30, the image processor unit 31 recognizes a road mark included in a picture taken by the camera 30 as the road mark of the carpool lane and supplies a result of the recognition to the control unit 29. In many cases, since a road mark is generally drawn on the surface of a road repeatedly at intervals in the traveling direction of the vehicle, detection of the road mark during a predetermined period of time (or within a predetermined traveling distance) leads the control unit 29 to a determination result indicating that the vehicle is traveling on the carpool lane, that is, a YES determination result at S20. When the road mark is not detected during the predetermined period of time or within the predetermined traveling distance, on the other hand, a determination result of NO is at S20 to indicate that the vehicle is not traveling on the carpool lane.

When the determination result at S20 is YES indicating that the vehicle is traveling on the carpool lane, the guidance control processing proceeds to S30 to display a message indicating that the vehicle is traveling on the carpool lane on the display unit 26. Specifically, for example, a map is conceivably displayed on the left-half side of the display screen of the display unit 26 and a phrase indicating: "The vehicle is traveling on the carpool lane" is displayed at the uppermost position of the left-half side of the display screen as a message G1 shown in FIGS. 5B and 5C.

Then, the guidance control processing proceeds to S40 to determine whether or not a guiding route has been set. When the determination result at S40 is NO indicating that a guiding route has been not set, the guidance control processing proceeds to S50 at which guidance toward a carpool-lane exit existing ahead of the vehicle is displayed on the display unit 26. Specifically, for example, a predetermined number of carpool-lane exits are displayed on the right-half side of the display screen of the display unit 26 as a message G2 shown in FIG. 5B. In the example shown in FIG. 5B, the number of carpool-lane exits is 2. It is to be noted that, in the following description, as described earlier, the carpool-lane exit is referred to simply as a carpool exit, which is denoted by reference notation 'CP exit' in FIGS. 5A, 5B and 5C. The figures also show exits associated with each carpool exit as exits from the ordinary roadway to other roads.

The following description explains a display of exits associated with a carpool exit as exits from the ordinary roadway to other roads.

For example, it is assumed that the carpool lane is in a condition of being related to the ordinary roadway as shown in FIG. 5A. As shown in the figure, taking the present position of the vehicle as a reference, a carpool exit X exists ahead of the reference, being followed by a carpool exit Y, which is followed by subsequent carpool exits. These carpool exits provided sequentially are each an exit from the carpool lane to the ordinary roadway. On the other hand, exits A, B, C, D, E, F and so on each exists as an exit from the ordinary roadway to other roads. When a vehicle changes its traveling path from the carpool lane to the ordinary roadway through the carpool exit X, the vehicle will not be able to move from the ordinary roadway to another road through the exit A but the vehicle will be able to exit from the ordinary roadway to another road through any one of the exits B, C and D. When a vehicle changes its traveling path from the carpool lane to the ordinary roadway through the carpool exit Y, on the other hand, the vehicle will be able to move from the ordinary roadway to another road through either of the exits E and F.

Of course, when a vehicle changes its traveling path from the carpool lane to the ordinary roadway through the carpool exit X, the vehicle will also be able to exit from the ordinary roadway to another road through either of the exits E and F. In this embodiment, however, it is assumed that using the carpool lane to the utmost is preferable. For this reason, the message G2 shown in FIG. 5B states: 'Next CP exit→exits B, C and D' and 'CP exit after next CP exit→exits E and F'. This message is to be interpreted by the user with ease as follows. When a vehicle wants to change its travel line from the ordinary roadway to another road through any one of the exits B, C and D, the use of the carpool exit X is optimum. When a vehicle driver wants to change its travel lane from the ordinary roadway to another road through any either of the exits E and F, on the other hand, the use of the carpool exit Y is optimum.

It is to be noted that, in this embodiment, the number and name of an intersecting road are assigned to each of the exits A, B, C and so on each used as an exit from the ordinary roadway to another road serving as the intersecting road, and included in the map data. On the other hand, neither road number nor road name is assigned specially to each of the carpool exits X and Y. For this reason, in a guidance message, a carpool exit is referred to as 'Next CP exit' or 'CP exit after next CP exit. In addition, for the exits A, B, C and so on each used as an exit from the ordinary roadway to another road, only either the road number or the road name can be displayed. As an alternative, both the road number and the road name can also be displayed.

Relations between carpool exits and exits from the ordinary roadway to other roads are stored in advance in the map data. Thus, when the vehicle is traveling on a carpool lane, the control unit 29 is capable of retrieving a relation between a carpool exit existing ahead of the vehicle and exits each associated with the carpool exit as an exit from the ordinary roadway to another road.

In addition, in the embodiment, the traveling direction of a vehicle is a direction from the lower part of the display screen of the display unit 26 to the upper part of the display screen. That is, on the left-half side of the display screen, a map is displayed in such an orientation that a direction from the lower part of the map to the upper part of the map coincides with the traveling direction of the vehicle. This function to display a map in such an orientation is commonly known as a heading-up function. Also in the exit guidance displayed on the right-half side of the display screen, the lower part of the display screen is taken as the position of the vehicle moving in a direction toward the upper part of the screen. In this direction, carpool exits X, Y and so on are sequentially displayed on the screen. By having such displays on the left and right-half sides of the display screen, the direction of the display on the left-half side agrees with the direction of the display on the right-half side. Thus, the user viewing the displays is capable of intuitively understanding the relation between the displays on the left and right-half sides of the display screen with ease.

Then, the guidance control processing returns from S50 to S10.

When the determination result at S40 is YES, that is, when the determination result at S40 is an affirmation indicating that a guiding route has been set, on the other hand, the guidance control processing proceeds to S60 at which exit guidance for the carpool lane according to a set guiding route is displayed on the display unit 26. It is assumed for example that a guiding route has been set to depart from the ordinary roadway through the exit C. In order for the vehicle to depart from the ordinary roadway through the exit C in accordance with the set guiding route, it is necessary for the vehicle to enter the ordinary roadway from the carpool lane through the carpool exit X. In this case, the control unit 29 displays guidance typically suggesting the vehicle to enter the ordinary roadway from the carpool lane through the carpool exit X as shown in FIG. 5C on the right-half side of the display screen of the display unit 26. For example, the control unit 29 conceivably displays a phrase stating: "Depart from the carpool lane through the next CP exit" as a message G3 shown in FIG. 5C. It is to be noted that, in the embodiment, a message stating: 'Next CP exit→exits B, C and D' is also displayed besides the message G3 as a relation between a carpool exit existing ahead of the vehicle and exits each associated with the carpool exit as an exit from the ordinary roadway to another road.

After the guidance for the carpool lane according to a set guiding route is displayed on the display unit 26 at S60, the guidance control processing proceeds to S70 to determine whether or not the vehicle has passed by the location of the carpool exit suggested in the guidance. When the determination result at S70 is NO indicating that the vehicle has not passed by the location of the carpool exit suggested in the guidance, the guidance control processing returns to S60 to repeat the process of S60. As a matter of fact, the processes of the S S60 and S70 are carried out repeatedly as long as the determination result at S70 is NO. As the determination result at S70 is YES indicating that the vehicle has passed by the location of the carpool exit suggested in the guidance, the guidance control processing proceeds to S80 to determine whether or not a road on which the vehicle is traveling is a carpool lane. The process carried out at S80 is the same as the process carried out at S20.

When the determination result at S80 is NO indicating that a road on which the vehicle is traveling is no longer a carpool lane or the vehicle is traveling on the ordinary roadway, the guidance control processing proceeds to S90 at which the message G1 stating that the vehicle is traveling is on a carpool lane and the message G3 serving as guidance suggesting exits as shown in FIG. 5C are discontinued or stopped. Then, the guidance control processing proceeds to S120 at which guidance not customized to a carpool lane is provided.

The following description briefly explains a case in which the guidance control processing proceeds from S90 to S120 to provide the user with guidance not customized to a carpool lane. In this case, the map displayed on the left-half side of the screen as shown in FIG. 5C as a map prepared for route guidance is typically displayed on the entire screen. Then, on the assumption that a route has been set as a route suggesting that the vehicle change its traveling path from the ordinary roadway to another road through the exit C, for example, an enlarged figure of the exit C is displayed on the right-half side of the screen and the map prepared for route guidance is displayed on the left-half side of the screen as the vehicle approaches the exit C. Since the guidance not customized to a carpool lane is commonly known guidance, its details are not described.

When the determination result at S80 is YES, that is, when the determination result at S80 is an affirmation indicating that a road on which the vehicle is traveling is still a carpool lane or the vehicle is still traveling on the carpool lane, on the other hand, the guidance control processing proceeds to S100 at which a new route is set. That is, when a route has been set as a route suggesting that the vehicle change its traveling path from the ordinary roadway to another road through the exit C, in order for the vehicle to depart from the ordinary roadway through the exit C in accordance with the set guiding route, it is necessary for the vehicle to enter the ordinary roadway from the carpool lane through the carpool exit X. The fact that the vehicle traveled past the location of the carpool exit X and is still traveling on the carpool lane in spite of the guiding route means that the vehicle did not enter the ordinary roadway through the carpool exit X. In this case, since the vehicle has failed to travel in accordance with the set guiding route, a new route is set. For example, the new guiding route suggests that the vehicle change its traveling path from the carpool lane to the ordinary roadway through the carpool exit Y, move from the ordinary roadway to another road through the exit E, and reach a final destination by traveling along the other road. Since the technique to set a guiding route anew is a commonly known technology, details of the technique are not described.

After the process of S100 is completed, the guidance control processing returns to S60 at which exit guidance for the carpool lane according to the newly set guiding route is displayed on the display unit 26. For example, the control unit 29 displays a phrase stating: "Depart from the carpool lane through the next CP exit."

When the determination result at S10 is a denial, that is, when the determination result at S10 is NO meaning that the vehicle is traveling on a road not including a carpool lane or, when the determination result at S20 is a denial, that is, when the determination result at S20 is NO meaning that the vehicle is not traveling on a carpool lane, on the other hand, the guidance control processing proceeds to S110. A message indicating that the vehicle is traveling and a message showing exit guidance are discontinued when those massages have been displayed so far.

The following description explains a typical case in which the determination results produced in the processes carried out at S10 and/or S20 are denials. First of all, the determination results produced in the processes carried out at S10 and/or S20 are affirmations causing the guidance control processing to proceed to S30 to display a message indicating that the vehicle is traveling. Then, when the determination result at next S40 is a denial, the guidance control processing proceeds to S50 at which exit guidance is displayed. However, the determination results produced in the processes carried out at S10 and/or S20 after completing the process of the S50 may be denials in some cases. In such cases, since it is necessary to discontinue the messages displayed in the processes carried out at S30 and S50, the process of S110 is carried out.

After the process of S110 is completed, the guidance control processing proceeds to S120 at which normal guidance not customized to a carpool lane is provided to the user. Since the process of S120 has been described, it is not necessary to repeat the explanation. After the process of S120 is completed, the guidance control processing returns to S10.

(Advantage)

The navigation apparatus 1 according to the embodiment exhibits the following effects.

(1) In the case of the conventional apparatus, no process is carried out to determine whether the present position on a carpool lane or an ordinary roadway. In accordance with the technology, when a traveling-path changing area allowing a vehicle to change its traveling path from a carpool lane to an ordinary roadway exists ahead of the vehicle, the driver of the vehicle is merely informed of the existence of the traveling-path changing area. Accordingly, when the vehicle driver notified of the existence of the traveling-path changing area is able to correctly determine whether the present position is on a carpool lane or an ordinary roadway, no problem may be raised. However, a navigation apparatus 1 is effectively used in particular at a place where the user drives the vehicle for the first time or in an area with road conditions not known by the user. Thus, it is preferable to provide guidance user-friendly for a user not familiar with carpool lanes.

The present embodiment provides a navigation apparatus 1 capable of automatically determining whether or not the vehicle is traveling along a carpool lane typically on the basis of a road mark provided on the surface of the road in the processes carried out at S20 and S80 of the flowchart shown in FIG. 4 and capable of carrying out navigation processing at S50 and S60 of the same flowchart to indicate that a carpool exit serving as a traveling-path changing area allowing a vehicle to change its traveling path from a carpool lane to an ordinary roadway exists ahead of the vehicle only when the result of the determination indicates that the vehicle is traveling along a carpool lane. That is, even though the user does not need to correctly determine whether the present position is on a carpool lane or an ordinary roadway, when the user wants to change the traveling path from a carpool lane to an ordinary roadway and is notified that a traveling-path changing area exists ahead of the vehicle, the user needs merely to change the traveling path in accordance with the guidance notice. Thus, the guidance provided to the user is user-friendly for the user.

(2) As described above, in accordance with the conventional apparatus, navigation processing is carried out to indicate that a carpool exit exists ahead of the vehicle. Thus, when a vehicle has departed from a carpool lane of a freeway and entered an ordinary roadway of the same freeway in an attempt to leave the freeway through an exit of the freeway and travel on another road, for example, the vehicle also receives guidance indicating that a carpool exit exists ahead of the vehicle.

In the case of the navigation apparatus 1 provided by the present embodiment, on the other hand, navigation processing is carried out to give a notice of existence of a carpool exit in the processes carried out at S50 and S60 of the same flowchart only to a vehicle traveling along a carpool lane as indicated by a YES determination result at S20 of the same flowchart. Thus, the present embodiment is very preferable in that only guidance useful to the user is given to the user.

(3) When only the position detection method using the GPS is executed for determining whether or not the vehicle is traveling along a carpool lane, a high-precision result will be difficult to obtain. Of course, a communication between an onboard device mounted on the vehicle and on-road devices provided on a carpool lane can be carried out for determining whether or not the vehicle is traveling along a carpool lane. However, this solution to the problem is based on the assumption of complete infrastructure equipment including the on-road devices provided on a road. Thus, this solution to the problem is difficult to implement.

In the case of the navigation apparatus 1 provided by the present embodiment, on the other hand, by merely devising only an onboard navigation apparatus 1 mounted on the vehicle, the navigation apparatus 1 is capable of determining whether or not the vehicle is traveling along a carpool lane. In addition, composed of only the camera 30 and the image processor unit 31 for recognizing a figure in a picture taken by the camera 30, the configuration of the navigation apparatus 1 can be realized relatively with ease. For example, for the road mark having the shape resembling a diamond to serve as a road mark on the surface of a road, a template is prepared in advance. The carpool-lane mark existing on the surface of a carpool lane can then be recognized with ease by carrying out a pattern matching process of determining whether or not a figure in a taken picture of the road mark matches the template.

(4) Only when the vehicle is traveling along a carpool lane as indicated by a YES determination result at S20 of the same flowchart and a guiding route has been set as indicated by a YES determination result at S40 of the same flowchart, peculiar exit guidance customized to the carpool lane is provided at S60 of the same flowchart. By providing such route guidance, the present embodiment is very preferable in that only guidance useful to the user is given to the user.

(5) When a YES determination result is produced in the processes carried out at S70 and/or S80 of the same flowchart to indicate that the vehicle has failed to depart from a carpool lane through a carpool exit suggested by a guiding route as an exit through which the vehicle should depart from the carpool lane to an ordinary roadway, a new guiding route is automatically set at S100 of the same flowchart. Then, the process is carried out at S60 of the same flowchart to show a carpool exit suggested by the new guiding route as an exit through which the vehicle should depart from the carpool lane to an ordinary roadway.

(6) When the vehicle is traveling along a carpool lane as indicated by a YES determination result at S20 of the same flowchart, a message indicating that the vehicle is traveling along the carpool lane is displayed on the display unit 26 at S30 of the same flowchart. By displaying such a message, the user is able to immediately know that the vehicle is traveling along a carpool lane at the present time. The navigation apparatus 1 is effectively used in particular at a place where the user drives the vehicle for the first time or in an area with road conditions not known by the user. Thus, it is preferable to provide guidance user-friendly for a user not familiar with carpool lanes. From this point of view, the message is useful to the user.

In this embodiment, a phrase stating: "The vehicle is traveling on the carpool lane" as shown in FIGS. 5B and 5C is displayed on the display unit 26. It is to be noted, however, that the navigation apparatus 1 may also carry out a process to change already displayed information to information displayed in a display format recognizable by the user to indicate that the vehicle is traveling on a special roadway. For example, the navigation apparatus 1 carries out a process to change the display of a present-position mark from a state not blinking so far to a blinking state in the case of the present-position mark used as a road mark displayed on the screen to indicate the present position of the vehicle.

(7) When the vehicle is traveling on a carpool lane, the user of course wants to know information on a traveling-path changing area allowing a vehicle to change its traveling path from a carpool lane to an ordinary roadway. In some cases, however, while the vehicle is still traveling on the carpool lane, the user may also want to know information on an exit through which the vehicle should move from the ordinary roadway to another road after the vehicle has entered the ordinary roadway.

In order to meet such a demand, as shown in FIGS. 5B and 5C, the navigation apparatus 1 displays not only carpool exits, but also exits associated with the carpool exits as exits through which the vehicle should move from the ordinary roadway to other roads.

The above embodiment may be modified as follows.

(A) In order for the navigation apparatus 1 according to the embodiment described so far to determine whether or not a vehicle is traveling on a carpool lane, the camera 30 takes a picture of a phrase indicating: "CARPOOL LANE" or a road mark having the shape of a diamond from the surface of the road serving as the carpool lane, and the image processor unit 31 recognizes a road mark indicating the carpool lane on the basis of the picture taken by the camera 30.

Instead of taking a picture of a road mark on the surface of road, a picture of a road sign installed on the road shoulder of the carpool lane can also be taken. In order to quickly determine whether or not a vehicle is traveling on a carpool lane, however, it is preferable to install the objects of detection at a large number of locations. Thus, when more road marks are drawn by using paint on the surface of a carpool lane at intervals shorter than intervals at which road signs are installed on the road shoulder of the carpool lane, the road marks will serve as better objects of detection.

Of course, while both road marks and road signs may also be detected, only road marks may also be detected. When only road marks are taken as objects of detections as is the case with the embodiment described earlier, however, the photographing range of the camera 30 is limited. Thus, the processing workload borne by the image processor unit 31 can be expected to relatively decrease.

It is to be noted that, in many cases, the phrase indicating: "CARPOOL LANE" or the road mark having the shape of a diamond is drawn on the surface of a carpool lane by using paint of a white color. Thus, the phrase or the road mark having the shape of a diamond can be conceivably detected by using an infrared ray sensor in place of the camera 30.

(B) In the embodiment described above, a carpool lane is taken into consideration as a detailed example of a typical special roadway. However, a plurality of roads having the same traveling direction have a configuration including a special roadway having no exits to other roads and an ordinary roadway having exits to other roads. In addition, in a special case, a vehicle is allowed to change its traveling path from the special roadway to the ordinary roadway or vice versa only in a predetermined traveling-path changing area. In this special case where a similar problem is raised, the special roadway is referred to as a carpool lane. Another example of the special roadway is an express lane, which exists in the East-Coast areas of the U.S.

Figure 6:
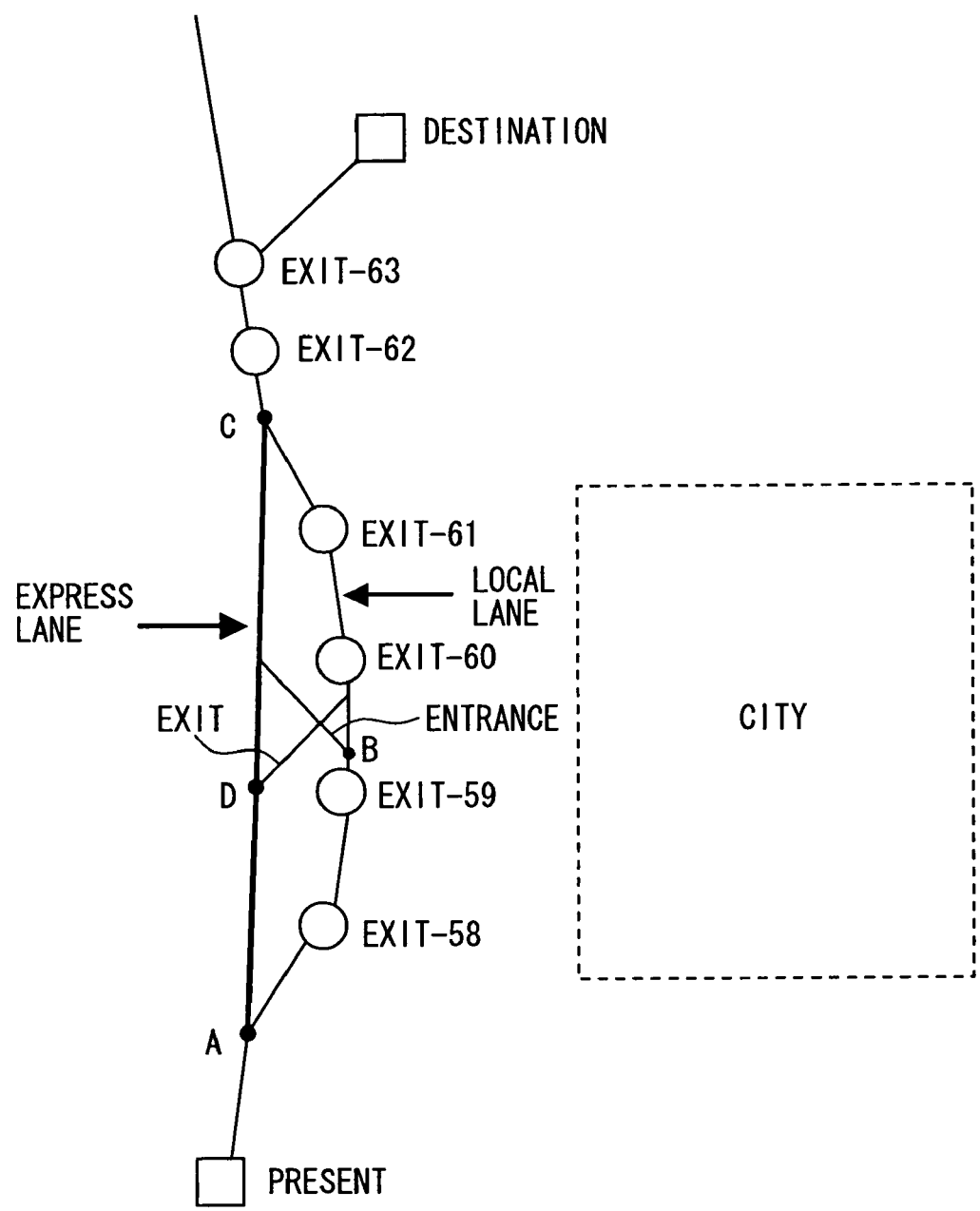
FIG. 6 is a schematic diagram showing a typical express lane.

The express lane has the same road structure as the carpool lane. Unlike the carpool lane, however, the express lane does not impose the special conditions on vehicles traveling on it. FIG. 6 shows a detailed example of the express lane. For example, this express lane is provided as a portion of a freeway in a suburb of a big city to contribute to avoidance of traffic congestions. This is because traffic congestions along the freeway are expected due to a large number of vehicles departing from the suburb to enter the big city and entering the suburb from the big city. When vehicles departing from the suburb but not entering the big city travel on the express lane, traffic congestions can be avoided.

It is assumed for example that a vehicle travels from the present position shown in FIG. 6 to a destination also shown in the same figure. In this case, in order to reach the destination, it is nice for the vehicle to depart from the freeway at an exit 63. In order for the vehicle to depart from the freeway at the exit 63, the navigation apparatus 1 provides the vehicle with traveling guidance to travel through the express lane. Thus, when the vehicle travels toward the destination in accordance with the traveling guidance, the vehicle is capable of bypassing exits 58 to 61 provided on a local lane provided to form a pair of roads in conjunction with the express lane.

When a route has been set as a route to lead the vehicle to depart from the local lane at the exit 60 or 61, for example, the route should also include a node D at which the vehicle should change its traveling path from the express lane to the local lane. When the vehicle does not change its traveling path from the express lane to the local lane at the node D but, instead, travels along the express lane as it is, going past the node D, it is necessary to set a new route leading the vehicle to the destination by way of a node C. In this case, by carrying out the processing represented by the flowchart shown in FIG. 4, it is possible to keep up with the case described above. The carpool lane in the processing represented by the flowchart corresponds to the express lane cited in the case described above.

In addition, in a possibly imaginable case, the driver of a vehicle mistakenly enters the local lane at a node A in spite of the fact that the vehicle must enter the express lane. In this case, the vehicle merely needs to enter the express lane from the special lane at a node B. Thus, determining that the vehicle is not traveling along a guiding route, a new route is set as a route of guiding the vehicle to enter the express lane from the special lane at a node B.

As described above, basically, an express lane can be treated like a carpool lane. In the case of an express lane, however, it is quite possible that, unlike a carpool lane, road marks do not exist on the surface of the express lane in some cases. Instead, for example, a road sign of an express line and a road sign of a local line are provided respectively on the left side of an entrance to the express lane and the right side of the entrance. In some cases, however, a road mark and a road sign, which indicate that the road is an express lane, do not exist at locations along the express lane.

In such cases, it is conceivable to determine whether or not a vehicle is traveling on an express lane as follows. At an exit from a local lane to another road, a road sign is naturally provided as a road sign indicating that the exit is an exit from the local lane to another road. The location of this exit is of course included in road data. Thus, it is possible to determine whether or not a road sign indicating an exit appears on an exit picture taken by the camera 30 at a location included in the road data as the location of this exit from the local lane to another road. When the vehicle is traveling on an express lane, the result of the determination must indicate that such a road sign does not appear on the exit picture. This is because a road sign indicating that the exit is an exit from the local lane to another road does not exist on an express lane. Thus, by adoption of this technique of determination, it is possible to determine whether a vehicle is traveling on an express lane or a local lane.

Thus, it is sufficient to merely determine whether or not a road sign indicating an exit exists. It is to be noted, however, that such a result of determination can be produced by searching a picture taken by the camera 30 for an exit structure itself. That is, when branching of a road is detected as a result of analyzing a picture taken by the camera 30, the result of the determination indicates that an exit exists. When the vehicle is traveling on an express lane, such an exit naturally does not exist. Thus, by adoption of this technique of determination, it is possible to determine whether a vehicle is traveling on an express lane or a local lane.

(C) Since a special roadway does not have an exit to another road, traveling-path changing areas each allowing a vehicle traveling on an ordinary road way to change its traveling path from the ordinary roadway to the special roadway include a specific traveling-path changing area through which the vehicle should not move from the ordinary roadway to the special roadway in order to travel in accordance with a guiding route. Thus, guidance showing a specific traveling-path changing area through which a vehicle should not change its traveling path from the ordinary roadway to the special roadway is also effective for the vehicle, which has passed by a location separated from the specific traveling-path changing area by a predetermined distance, approaching the specific traveling-path changing area.

(D) Conceivable guidance variations include guidance provided at a location following the entrance to a segment including a carpool lane or an express lane as guidance stating: "The start of a carpool lane or an express lane" and guidance provided at a location following the exit of a segment including a carpool lane or an express lane as guidance stating: "The end of a carpool lane or an express lane."

(E) In the above description, guidance is provided by displaying a picture on the display unit 26. Depending on the contents of the guidance, however, sounds stating a message can also be given to the user in some cases. For example, an audio message indicating: "Depart from this carpool lane at the next CP exit" can be given to the user as exit guidance according to a guiding route. Such an audio message can be output through the audio output unit 27 as a substitute for a picture display or along guidance based on the picture display.

What is claimed is:

1. An onboard navigation apparatus for a vehicle traveling along a plurality of roadways heading in the same direction, the onboard navigation apparatus comprising:
    a map data input means for inputting road data of the roadways including a special roadway, an ordinary roadway, and other roads, the special roadway having no exits to the other roads, the ordinary roadway having exits to the other roads and a predetermined traveling-path changing area provided between areas where the vehicle is not permitted to change a traveling path between the special roadway and the ordinary roadway despite the ordinary roadway and the special roadway being adjacent, as a sole area allowing the vehicle to change the traveling path thereof between the special roadway and the ordinary roadway, the onboard navigation apparatus comprising:
    a control configured to carry out predetermined navigation processing by using the road data including information on the predetermined traveling-path changing area;
    a sign/mark detector configured to detect at least one of a road sign and a road mark, which indicates the special roadway;
    a present-position determiner configured to determine a present position of the vehicle; and
    a guidance provider configured to provide guidance to a user of the vehicle,
    the predetermined navigation processing in the control is configured to set a guiding route including the special roadway and provide driving guidance for the guiding route to the user through the guidance provider on the basis of the present position determined by the present-position determiner, the control is configured to
    (1) determine whether the vehicle is traveling on the special roadway on the basis of a detection result generated by the sign/mark detector and the road data of the roadways inputted by the map data input means,
    (2) provide the user with special-roadway-specific guidance customized to the special roadway to include the predetermined traveling-path changing area in which the vehicle should change its traveling path from the special roadway to the ordinary roadway in order to travel in accordance with the guiding route, when the vehicle is determined as traveling on the special roadway, and
    (3) provide the user with ordinary guidance not customized to the special roadway, when the vehicle is determined as no longer traveling on the special roadway,
    the control being configured, after providing the user with special-roadway-specific guidance customized to the special roadway to include the predetermined traveling-path changing area in which the vehicle should change its traveling path from the special roadway to the ordinary roadway in order to travel in accordance with the guiding route, to
    (4) determine, after passing by the predetermined traveling-path changing area included in the guidance, whether the vehicle is no longer traveling on the special roadway, and
    (5) set a new guiding route and provides driving guidance for the new guiding route to the user, when the vehicle is determined as still traveling on the special roadway after passing by the predetermined traveling-path changing area included in the guidance customized to the special roadway.

2. The onboard navigation apparatus according to claim 1, the guidance provider further being configured, when the special roadway includes traveling-path changing areas allowing the vehicle traveling on the ordinary roadway to change its traveling path from the ordinary roadway to the special roadway and the traveling-path changing areas include a specific traveling-path changing area through which the vehicle cannot move from the ordinary roadway to the special roadway in order to travel in accordance with the guiding route, to provide guidance showing the specific traveling-path changing area to the user to suggest the user not to change the traveling path from the ordinary roadway to the special roadway through the specific traveling-path changing area as the vehicle passes by a location separated from the specific traveling-path changing area by a predetermined distance, approaching the specific traveling-path changing area.

3. The onboard navigation apparatus according to claim 1, wherein:
    the guidance provider includes at least a display means for displaying information; and
    the control is configured, when the vehicle is traveling on the special roadway, to display information, which can be recognized by the user as information indicating that the vehicle is traveling on the special roadway, or to change already displayed information to information having a display format recognizable to the user; and
    the control is configured, when the vehicle is no longer traveling on the special roadway, to discontinue the display of the information or restores the format of the already displayed information back to its original format.

4. The onboard navigation apparatus according to claim 1, wherein:
    the road data includes information associating the traveling-path changing area with an exit through which the vehicle is allowed to change from the ordinary roadway to the other road after changing its driving path from the special roadway to the ordinary roadway through the traveling-path changing area; and
    on the basis of the road data, the control displays information included in the road data as the information associating the exit with the traveling-path changing area existing within a predetermined range ahead of the vehicle to the user when the vehicle is traveling on the special roadway.

5. The onboard navigation apparatus according to claim 1, wherein:
    the sign/mark detector has a photographing member mounted on the vehicle; and on the basis of a picture taken by the photographing member, the sign/mark detector recognizes a sign or mark of a road as an indicator showing that the road is the special roadway.

6. The onboard navigation apparatus according to claim 5, wherein:
the road sign or the road mark is a mark drawn on the surface of the special roadway by using paint; and
the photographing member is installed at such a position that the photographing member is positioned to take a picture of a road mark existing ahead of the vehicle.

7. The onboard navigation apparatus according to claim 1, wherein:
the sign/mark detector is configured to detect an exit from the ordinary roadway to the other road; and
the control is configured to determine whether the vehicle is traveling on the special roadway on the basis of a detection result generated by the sign/mark detector as a result of detection of an exit provided at a location where the exit exists in accordance with the road data as the exit from the ordinary roadway to the other road.

8. The onboard navigation apparatus according to claim 1, wherein:
the special roadway is a road on which the vehicle is prohibited from traveling unless the vehicle satisfies a special condition; and
the ordinary roadway is a road on which the vehicle is allowed to travel without regard to the special condition.

9. The onboard navigation apparatus according to claim 8, wherein the special roadway is a carpool lane on which the vehicle is allowed to travel when the vehicle has at least a passenger besides the driver.

* * * * *